US010218292B2

(12) United States Patent
Huang et al.

(10) Patent No.: US 10,218,292 B2
(45) Date of Patent: Feb. 26, 2019

(54) ACTIVE POSITIONING ENCODER AND OPERATING METHOD THEREFOR

(71) Applicant: SHANGHAI JIAOTONG UNIVERSITY, Shanghai (CN)

(72) Inventors: Peisen S. Huang, Shanghai (CN); Junbin Zhang, Shanghai (CN); Zonghao Chen, Shanghai (CN); Jian Gao, Shanghai (CN)

(73) Assignee: Shanghai Jiaotong University, Shanghai (CN)

( * ) Notice: Subject to any disclaimer, the term of this patent is extended or adjusted under 35 U.S.C. 154(b) by 323 days.

(21) Appl. No.: 15/030,233

(22) PCT Filed: Oct. 17, 2014

(86) PCT No.: PCT/CN2014/088854
§ 371 (c)(1),
(2) Date: Jul. 18, 2016

(87) PCT Pub. No.: WO2015/055145
PCT Pub. Date: Apr. 23, 2015

(65) Prior Publication Data
US 2016/0356630 A1 Dec. 8, 2016

(30) Foreign Application Priority Data
Oct. 18, 2013 (WO) .............. PCT/CN2013/085487

(51) Int. Cl.
*G01D 5/347* (2006.01)
*H02N 2/02* (2006.01)
(Continued)

(52) U.S. Cl.
CPC .............. *H02N 2/028* (2013.01); *G01D 5/347* (2013.01); *G01D 5/34715* (2013.01);
(Continued)

(58) Field of Classification Search
CPC ...... H02N 2/028; H02N 2/0095; H02N 2/021; H02N 2/06; G01D 5/347; G01D 5/34715
See application file for complete search history.

(56) References Cited

U.S. PATENT DOCUMENTS

| 6,798,445 B1 * | 9/2004 | Brumitt ................ H04N 5/2224 348/207.11 |
| 2010/0157274 A1 * | 6/2010 | Shibazaki ........... G03F 7/70341 355/72 |

(Continued)

FOREIGN PATENT DOCUMENTS

| CN | 101526757 A | 9/2009 |
| CN | 101676805 A | 3/2010 |
| CN | 101689341 A | 3/2010 |

OTHER PUBLICATIONS

Anisimov et al, "Absolute scale-based imaging position encoder with submicron accuracy", May 2013, in Proceedings of SPIE—The International Society for Optical Engineering, 6 pages.*

(Continued)

*Primary Examiner* — David F Dunphy
(74) *Attorney, Agent, or Firm* — Quarles & Brady LLP

(57) ABSTRACT

Provided is an active positioning encoder, comprising: a display device, said display device being used for displaying at least a first pattern; a reading device, said reading device comprising at least a first read head, the first read head being used for reading the first pattern in order to obtain an image signal; a signal processing device, said signal processing device performing signal processing on the image signal of the first read head in order to determine the single-dimensional positioning of the first read head relative to the display device.

26 Claims, 10 Drawing Sheets

(51) Int. Cl.
H02N 2/00 (2006.01)
H02N 2/06 (2006.01)
(52) U.S. Cl.
CPC .......... *H02N 2/0095* (2013.01); *H02N 2/021* (2013.01); *H02N 2/06* (2013.01)

(56) References Cited

U.S. PATENT DOCUMENTS

2012/0092641 A1    4/2012  Cox et al.
2015/0076332 A1*   3/2015  Nagura .................. G01B 11/14
                                                   250/231.13
2016/0245673 A1*   8/2016  McAdam ........... G01D 5/34715

OTHER PUBLICATIONS

Engelhardt et al, "Absolute, high-resolution optical position encoder", 1996, Applied Optics, vol. 35, No. 1, 8 pages.*
Ohara, "Scanning probe position encoder (SPPE): a new approach for highprecision and high-speed position measurement system", 2001, 26th Annual International Symposium on Microlithography, 11 pages.*
PCT International Search Report and Written Opinion, PCT/CN2014/088854, dated Jan. 21, 2015.

* cited by examiner

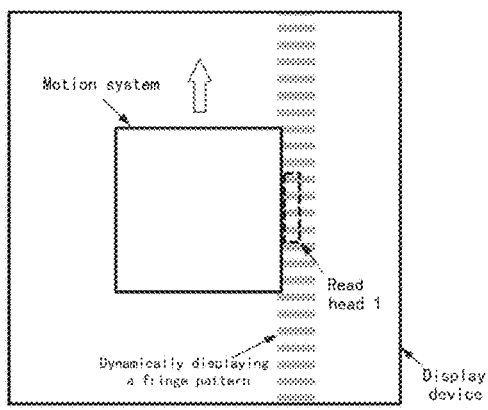
Fig.8a  One-dimensional linear motion
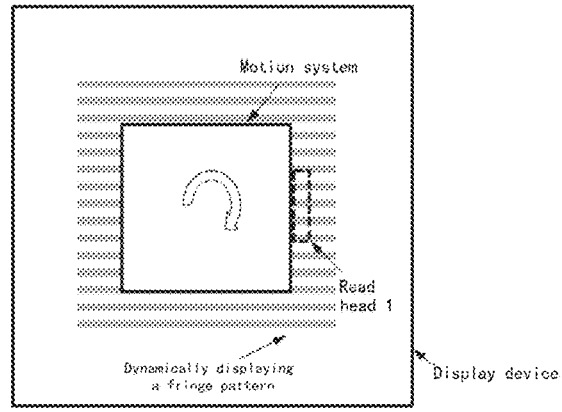
Fig.8b  One-dimensional rotary motion
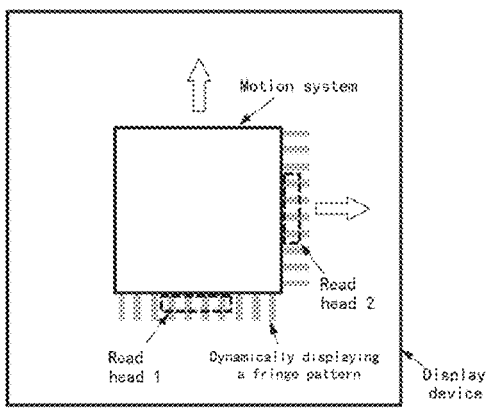
Fig.8c  XY linear motion
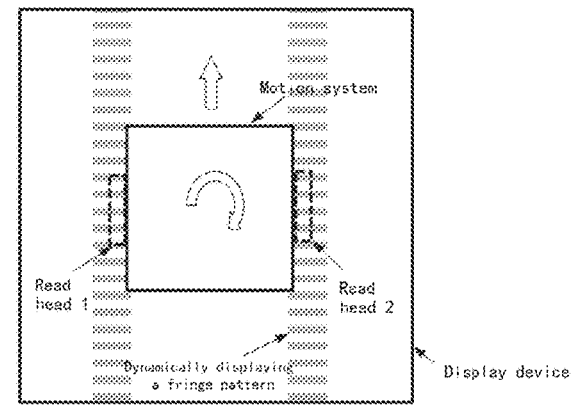
Fig.8d  Linear plus rotary motion
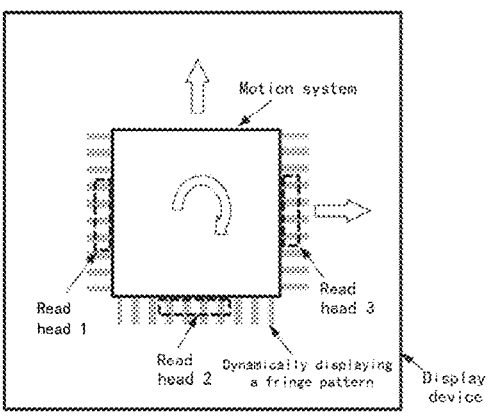
Fig.8e  Multi-dimensional planar motion
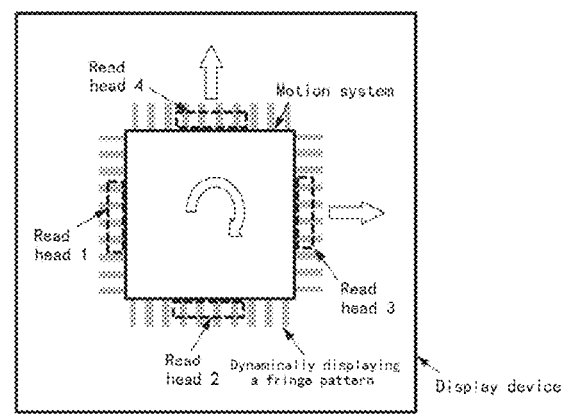
Fig.8f  Multi-dimensional planar motion

ACTIVE POSITIONING ENCODER AND OPERATING METHOD THEREFOR

CROSS-REFERENCE TO RELATED APPLICATIONS

This application represents the national stage entry of PCT International Application No. PCT/CN2014/088854 filed Oct. 17, 2014 and claims priority to PCT International Application No. PCT/CN2013/085487 filed Oct. 18, 2013. The contents of this application are hereby incorporated by reference as if set forth in their entirety herein.

TECHNICAL FIELD

The present invention relates to a position encoder, and in particular to an active position encoder and an operation method therefor.

BACKGROUND

A position encoder is a sensor for measuring physical quantities, such as length, angle and position, and is widely applied to the field of position measurement. At the current stage, most of the high-precision multi-degree of freedom displacement platforms use a plurality of linear gratings to be superimposed as a position feedback system. Such a position feedback system has significant disadvantages, wherein the perpendicularity and parallelism between platform degrees of freedom will affect the final position precision of a machine, which is called an Abbe error. Since a control system is not a closed-loop feedback, an error of a part caused by temperature or stress deformation also cannot be eliminated.

In order to solve the above-mentioned problems, many research and development departments and companies start to develop a planar encoder as a position feedback system. A planar encoder needs to use a planar grating for measurement. Such an encoder can achieve multi-degree of freedom position measurement, and furthermore can eliminate the Abbe error and realize the closed-loop control. A grating in a planar encoder is generally engraved with a two-dimensional periodic pattern, and the position resolution finally fed back by the grating can reach nanoscale. However, due to the complexity of a grating manufacturing process, the manufacturing cost of a large planar grating is very high, and particularly the machining process of the grating will be more complex when a high-precision position needs to be acquired.

Therefore, there is an urgent need for a novel position encoder in the art.

SUMMARY OF THE INVENTION

A brief summary on one or more aspects is given below to provide the basic understanding for these aspects. The summary is not a detailed review for all the conceived aspects, and is neither intended to point out all the critical or decisive factors for all the aspects nor trying to define the scope of any or all of the aspects. Its only object is to provide in a simplified manner some concepts of one or more aspects as the preface of the more detailed description given later.

According to an aspect of the present invention, an active position encoder is provided, the active position encoder comprising: a display device, the display device being used for displaying at least a first pattern; a reading device, the reading device comprising at least a first read head, the first read head being used for reading the first pattern in order to obtain an image signal; and a signal processing device, the signal processing device executing signal processing on the image signal of the first read head in order to determine a single-dimensional position of the first read head relative to the display device.

In an example, the first pattern is a first periodic pattern which changes periodically in a first direction, the first read head reads the first periodic pattern so as to obtain the image signal of a part of the periodic pattern in the first direction, and the signal processing device executes the signal processing on the image signal of the first read head so as to determine the single-dimensional position of the first read head in the first direction relative to the display device.

In an example, the signal processing device determines period information about a period in which the first read head is located and intra-period position information in the period in which the first read head is located; and determines the single-dimensional position based on the period information and the intra-period position information.

In an example, the display device displays an encoded pattern extending in the first direction, wherein the first read head reads the encoded pattern so as to obtain the period information.

In an example, the signal processing device acquires the period information by means of a period counting method.

In an example, the signal processing device: executes frequency domain transformation on the image signal of the first read head; extracts phase information about a fundamental frequency component of the image signal; and determines the intra-period position information about the first read head based on the phase information.

In an example, the signal processing device firstly pre-processes the image signal of the firstly read head, and then executes the frequency domain transformation on the pre-processed image signal.

In an example, the pre-processing comprises using a window function to perform windowing processing on the image signal.

In an example, the window function comprises a Hanning window function or a standard window function.

In an example, the display device changes the direction of periodic change of the first periodic pattern from the first direction to a second direction, wherein the first read head reads the first periodic pattern so as to obtain an image signal of a part of the periodic pattern in the second direction, and the signal processing device executes signal processing on the image signal of the first read head so as to determine a single-dimensional position of the first read head in the second direction relative to the display device.

In an example, the display device is further used for displaying additional periodic patterns, and the reading device further comprises additional read heads, wherein each read head reads a corresponding periodic pattern so as to obtain a corresponding image signal, and the signal processing device analyses and processes the image signal of each read head so as to determine a single-dimensional position of each read head relative to the display device, and determines plane position information about a motion system based on the single-dimensional position of each read head relative to the display device.

In an example, the display device is further used for displaying a second periodic pattern, the second periodic pattern changing periodically in the second direction; and the reading device further comprises a second read head, wherein the second read head is used for reading the second periodic pattern so as to obtain an image signal of the part of the periodic pattern in the second direction; and the signal processing device executes signal processing on the image signal of the second read head so as to determine a single-dimensional position of the second read head in the second direction relative to the display device, wherein the signal processing device determines plane position information about a motion system based on the single-dimensional positions of the first and second read heads.

In an example, the reading device further comprises a third read head, wherein the third read head is used for reading the first periodic pattern so as to obtain an image signal of the part of the periodic pattern in the first direction; and the signal processing device executes signal processing on the image signal of the third read head so as to determine a single-dimensional position of the third read head in the first direction relative to the display device; and wherein the signal processing device determines the plane position information about the motion system based on the single-dimensional positions of the first, second and third read heads.

In an example, the display device further at least comprises a fourth read head, wherein the fourth read head is used for reading the second periodic pattern so as to obtain an image signal of the part of the periodic pattern in the second direction, and the signal processing device executes signal processing on the image signal of the fourth read head so as to determine a single-dimensional position of the fourth read head in the second direction relative to the display device, wherein the signal processing device determines the plane position information about the motion system based on the single-dimensional positions of the first, second, third and fourth read heads.

In an example, it is characterized in that the relative movement of the motion system and the display device comprises a linear motion and a self-spinning motion in the first direction and the second direction, and the plane position information comprises a coordinate position and a self-spinning angle in the first direction and the second direction.

In an example, the display device displays, in a reading area of each read head, a periodic pattern that the read head should read, so that each read head can acquire a periodic pattern in a required direction.

In an example, the display device displays the periodic patterns in a time-sharing manner, wherein each read head reads the periodic pattern that the read head should read when the periodic pattern is displayed.

In an example, the display device displays the periodic patterns simultaneously with different colours, wherein each read head is mounted with a filter or uses a colour photosensitive element, so that each read head can read the periodic pattern that the read head should read.

In an example, the display device displays the periodic patterns simultaneously with different polarized light, wherein each read head is mounted with a corresponding polaroid, so that each read head can read the periodic pattern that the read head should read.

In an example, each read head is a part of a multi-dimensional read head adopting an area array photosensitive element, and the single-dimensional position of each part of the multi-dimensional read head relative to the display device is used for acquiring multi-dimensional plane position information about a motion system.

In an example, each read head comprises a photosensitive element.

In an example, the photosensitive element comprises at least one of a linear array photosensitive chip, an area array photosensitive chip and a photodiode.

In an example, each read head further comprises an optical imaging system.

In an example, the optical imaging system comprises at least one of an SLA lens array, a micro lens array and an optical lens group.

In an example, the display device is at least one of a display screen, a projector or a light-emitting diode array.

In an example, the first periodic pattern is a periodic fringe pattern comprising a series of fringes that change light and dark periodically in a first direction.

In an example, the periodic fringe pattern is a periodic sinusoidal fringe pattern.

According to another aspect of the present invention, a method for operating an active position encoder is provided, the method comprising: displaying at least a first pattern on a display device; using a first read head of a reading device to read the first pattern so as to obtain an image signal; and executing signal processing on the image signal of the first read head so as to determine a single-dimensional position of the first read head relative to the display device.

In an example, the first pattern is a first periodic pattern which changes periodically in a first direction, and the method further comprises: using the first read head to read the first periodic pattern so as to obtain the image signal of a part of the periodic pattern in the first direction; and executing the signal processing on the image signal of the first read head so as to determine a single-dimensional position of the first read head in the first direction relative to the display device.

In an example, executing the signal processing on the image signal of the first read head so as to determine a single-dimensional position of the first read head in the first direction relative to the display device specifically comprises: determining period information about a period in which the first read head is located and intra-period position information in the period in which the first read head is located; and determining the single-dimensional position based on the period information and the intra-period position information.

In an example, the method further comprises: displaying an encoded pattern extending in the first direction; and using the first read head to read the encoded pattern so as to obtain the period information.

In an example, the method further comprises: acquiring the period information by means of a period counting method.

In an example, determining the intra-period position information about the first read head specifically comprises: executing frequency domain transformation on the image signal of the first read head; extracting phase information about a fundamental frequency component of the image signal; and determining the intra-period position information about the first read head based on the phase information.

In an example, the method further comprises: pre-processing the image signal of the first read head; and executing the frequency domain transformation on the pre-processed image signal.

In an example, the pre-processing comprises using a window function to perform windowing processing on the image signal.

In an example, the method further comprises: changing the direction of periodic change of the first periodic pattern from the first direction to a second direction on the display device; using the first read head to read the first periodic pattern so as to obtain the image signal of a part of the periodic pattern in the second direction; and executing signal processing on the image signal of the first read head so as to determine a single-dimensional position of the first read head in the second direction relative to the display device.

In an example, the reading further comprises additional read heads, and the method further comprises: further displaying additional periodic patterns on the display device; using each read head to read a corresponding periodic pattern so as to obtain a corresponding image signal; analysing and processing the image signal of each read head so as to determine a single-dimensional position of each read head relative to the display device; and determining plane position information about a motion system based on the single-dimensional position of each read head relative to the display device.

In an example, the method further comprises: further displaying a second periodic pattern on the display device, wherein the second periodic pattern changes periodically in the second direction; using a second read head of the reading device to read the second periodic pattern so as to obtain an image signal of a part of the periodic pattern in the second direction; executing signal processing on the image signal of the second read head so as to determine a single-dimensional position of the second read head in the second direction relative to the display device; and determining the plane position information about the motion system based on the single-dimensional positions of the first and second read heads.

In an example, the method further comprises: using a third read head of the reading device to read the first periodic pattern so as to obtain an image signal of a part of the periodic pattern in the first direction; executing signal processing on the image signal of the third read head so as to determine a single-dimensional position of the third read head in the first direction relative to the display device; and determining the plane position information about the motion system based on the single-dimensional positions of the first, second and third read heads.

In an example, the method further comprises: at least using a fourth read head of the reading device to read the second periodic pattern so as to obtain an image signal of a part of the periodic pattern in the second direction; executing signal processing on the image signal of the fourth read head so as to determine a single-dimensional position of the fourth read head in the second direction relative to the display device; and determining the plane position information about the motion system based on the single-dimensional positions of the first, second, third and fourth read heads.

In an example, the movement of the motion system relative to the display device comprises a linear motion and a self-spinning motion in the first direction and the second direction, and the plane position information comprises a coordinate position and a self-spinning angle in the first direction and the second direction.

In an example, displaying the periodic patterns on the display device specifically comprises: with the movement of each read head, displaying, in a reading area of the display device corresponding to each read head, a periodic pattern that the read head should read; or displaying the periodic patterns in a time-sharing manner on the display device; or displaying the periodic patterns simultaneously with different colours or different polarized light on the display device.

BRIEF DESCRIPTION OF THE DRAWINGS

After reading the detail description of the embodiments of the present disclosure in conjunction with the following drawings, the above-mentioned features and advantages of the present invention can be better understood. In the drawings, various components are not necessarily drawn to scale, and components with similar related characteristics or features may have the same or similar reference numerals.

FIGS. 8a to 8f illustrate a schematic diagram of using a plurality of read heads to measure multiple degrees of freedom according to an aspect of the present invention;

DETAILED DESCRIPTION

The present invention is described below in detail in conjunction with the accompanying drawings and particular embodiments. It is noted that the aspects described in conjunction with the accompanying drawings and particular embodiments are merely exemplary, and should not be construed as any limitation on the scope of protection of the present invention.

The present invention provides a novel active position encoder. Compared with a traditional grating position encoder, the active position encoder of the present invention uses a controllable display device as a position reference component similar to a grating. The active position encoder collects a periodic pattern displayed on the display device using a read head, and obtains position information about a measurement target (e.g., a motion system) relative to the display device by means of an image processing method.

With regard to the traditional grating position encoder, in addition to the complex manufacturing process and high price, its grating pattern is fixed and cannot be controlled during use, which brings a great limitation on position measurement.

The display device of the active position encoder of the present invention can use a program to actively change displayed patterns. Since the pattern can be changed, the system can dynamically display the required periodic pattern according to the required measurement resolution and measurement speed. The active position encoder can further dynamically switch to an absolute encoded pattern so as to realize the measurement of an absolute position. In addition, since the pattern can be changed, the active position encoder can further realize the position measurement under the situation of a motion system rotating with a large angle. These cannot be realized by a grating encoder at the current stage.

Since the active position encoder can use the existing display devices in market, for example, a display screen (such as an LCD and OLED screen), a projector, a light-emitting diode, etc., it has a huge price advantage. Therefore, compared with the common grating encoder, the active position encoder has greater advantages in price and technology.

Figure 1:
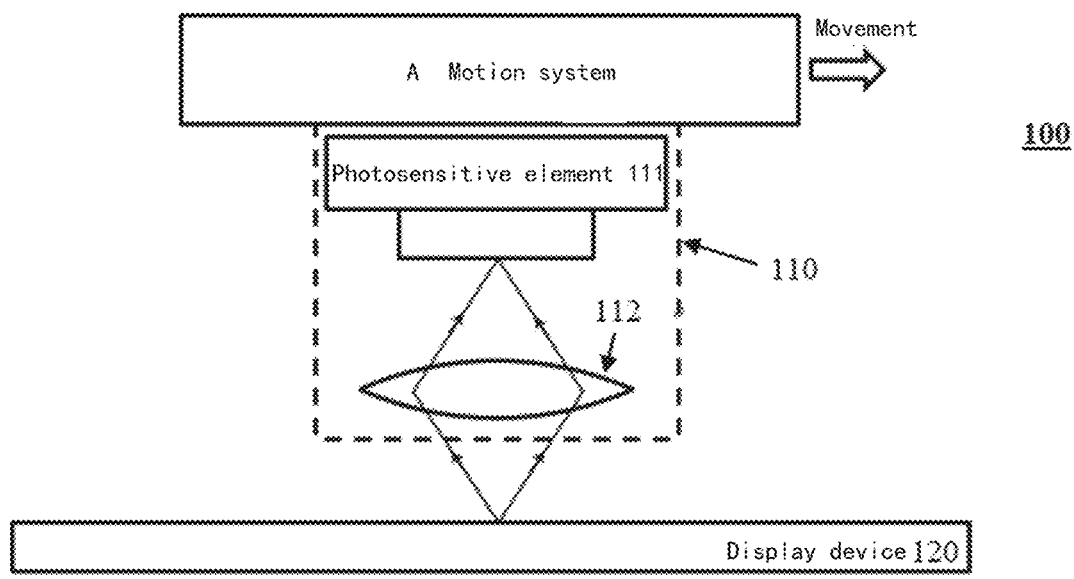
FIG. 1 is a simplified schematic diagram illustrating the basic principle of an active encoder according to an aspect of the present invention.

FIG. 1 is a simplified schematic diagram illustrating the basic principle of an active position encoder 100 according to an aspect of the present invention. As shown in FIG. 1, the active position encoder 100 can comprise a display device 120 and a read head 110. The read head 110 is attached to a motion system A. The motion system A can conduct a plane motion relative to the display device 120. With the plane movement of the motion system A, the read head 110 also conducts the completely consistent corresponding movement above the display device 120. It is noted that what is shown in the figure is that the motion system A moves while the display device 120 does not move; however, this is merely for displaying the relative motion of the two. In practice, it is possible that the motion system A does not move while the display device 120 moves, or the two both move. For example, the motion system A and the read head 110 are mounted on a stator, and the display device 120 is mounted on a rotor; or vice versa; or the motion system A and the read head 110, and the display device 120 are both mounted on the rotor.

In addition, FIG. 1 shows that the read head 110 is attached to the motion system A, and both the read head 110 and the motion system A move together relative to the display device 120. However, in other examples, it may also be possible that the display device 120 is attached to the motion system A, and the motion system A and the display device 120 move together relative to the read head 110. These specific situations do not limit the scope of protection of the present invention.

A reference pattern can be displayed on the display device 120. The display device 120 here can be any appropriate device, such as a display screen, a projector and a light-emitting diode array, that can display a pattern.

As shown in FIG. 1, the read head 110 can read a pattern in a field of view of the read head 110 on the display device 120. The read head 110 can comprise a photosensitive element 111 and an optical imaging system 112. The pattern on the display device 120 is transferred onto the photosensitive element 111 via the optical imaging system 112 for imaging, and then the photosensitive element 111 transmits imaging information to a processor (not shown) for signal processing.

The photosensitive element can adopt an area array photosensitive chip, a linear array photosensitive chip or a photosensitive diode. The photosensitive chip can be a CCD sensor, for example. The area array photosensitive chip has more photosensitive pixel points and collects more information, and therefore it can achieve a relatively high position resolution; however, due to more information, the area array photosensitive chip is relatively slow in signal processing and transmission, thereby affecting a measurement speed of the encoder. The linear array photosensitive chip has only one strip of photosensitive pixel array, and has much less pixel points compared with the area array photosensitive chip, and thus it is relatively fast in signal processing and transmission but relatively poor in a measured position resolution. The size of a single photosensitive pixel of the photosensitive diode is larger than that of the photosensitive chip, and thus the photosensitive diode has higher photosensitivity, and it can acquire a signal on the display device with only a very short time in exposure and is thus relatively fast in speed. However, there are less photosensitive pixel points, and thus finally the position resolution of the encoder is also relatively poor.

FIG. 1 shows that the read head 110 comprises the optical imaging system 112. However, this is not necessary, and the read head 110 can directly collect the signal on the display device 120 without using the optical imaging system 112. For example, the photosensitive element 111 can directly collect a pattern projected by the projector without using the optical imaging system 112. As another example, the photosensitive element 111 can be directly attached onto the surface of the display screen for signal collection.

Not using the optical imaging system can greatly reduce the complexity of the system; however, imaging will be blurring, and the final position resolution will also be poor. If an optical imaging system is used, the common optical imaging system 112 can comprise using an SLA (self-focusing) lens array, a micro lens array or an optical lens group to realize optical imaging. The use of the optical imaging system 112 will make the imaging to be clearer, and the final position resolution will be also better.

The pattern of the display device 120 captured by the read head 110 in the process of moving with the motion system A will also change correspondingly. Thereby, the position of the read head 110 relative to the display device 110 can be obtained by performing signal analysis on an image signal collected by the read head 110, so as to calculate plane motion position information about the motion system A. According to the present invention, the pattern displayed by the display device 120 can use a controller to perform dynamic transformation, so as to actively display a required pattern with regard to the measurement resolution and measurement speed required for the motion system. Particularly, the display device 120 can dynamically switch to the encoded pattern, so that the read head 110 can read encoded information so as to realize the measurement of the absolute position. Furthermore, by means of switching the direction of fringe change of a periodic pattern, the position measurement of the motion system A can be realized under a situation of self spinning with a large angle, as described below.

A read head measuring a single-dimensional linear motion position is taken as an example to describe the position measurement principle. A self-spinning motion with angle measurement, as well as multi-degree of freedom position measurement comprising linear motion and angle rotation can be obtained by means of geometric coordinate transformation based on a plurality of single-dimensional position measurement results.

Figure 2:
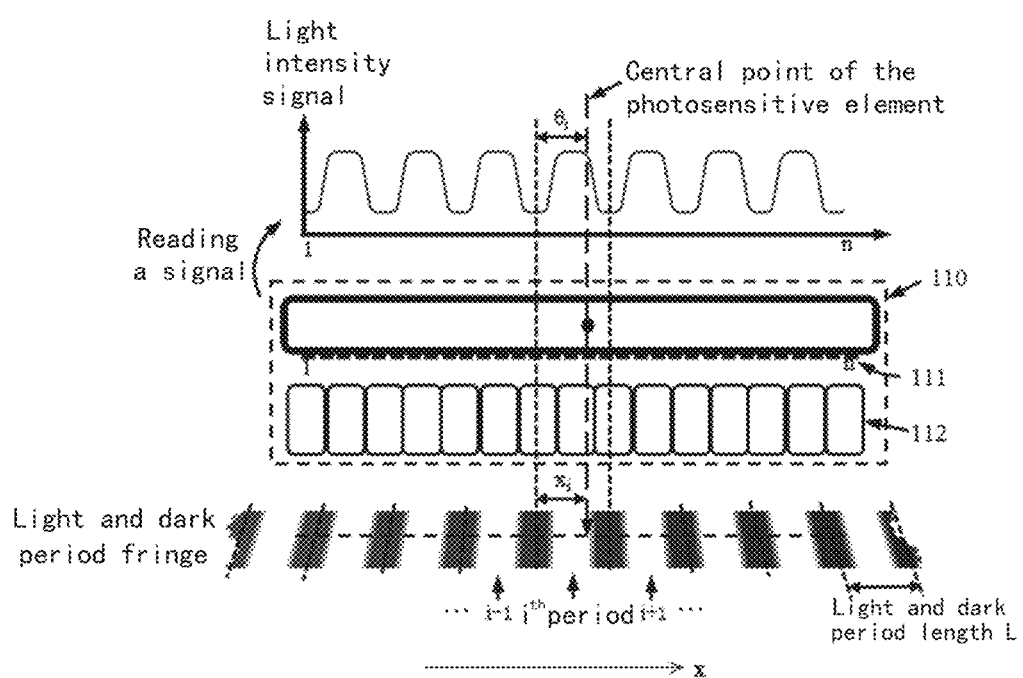
FIG. 2 is a schematic diagram illustrating a read head reading a periodic pattern according to an aspect of the present invention.

FIG. 2 is a schematic diagram illustrating a read head 110 reading a periodic pattern according to an aspect of the present invention. The display device can display a periodic pattern which changes periodically in a certain direction. As shown in FIG. 2, the first periodic pattern here is a periodic fringe pattern comprising a series of fringes that change light and dark periodically in the direction of an x axis, wherein the fringe pattern can further use a light and dark fringe pattern of which the intensity of lightness and darkness changes in a sinusoidal manner. It is assumed that a light and dark period length of the periodic pattern is L.

The read head 110 is directly facing the pattern, a length direction of the read head 110 (in particular, an imaging area thereof) is positioned in an x axis direction, so that a part of the periodic pattern in the x axis direction (i.e. the direction of light and dark period change) can be read. For example, the photosensitive element 111 of the read head 110 can be a linear array photosensitive chip.

This part of the fringe pattern is imaged onto a photosensitive pixel array of the photosensitive element 111 via the optical imaging system 112 so as to obtain an image signal representative of light intensity data of the lightness and darkness change. Particular signal processing (as described below) is performed on the image signal to obtain a position Xi of a central point of the read head 110 (in particular, the photosensitive element 111) within a single period where the central point is, as shown in FIG. 2. Assuming that the read head 110 is in an $i^{th}$ light and dark period of the periodic pattern displayed by the display device, then the position of the read head 110 relative to the display device is:

$$\text{the position of the read head} = L \times (i-1) + Xi \quad (1)$$

The "position of the read head" mentioned herein refers in particular to the position of the central point of the read head (in particular, the photosensitive element of the read head). It can be seen from formula 1 that the calculation of the position of the read head 110 consists of two parts, which are respectively period information about a period in which the read head 110 is located, and intra-period position information. The period information refers to which one the period in which the read head 110 is located is, i.e. i; and the intra-period position information refers to the position of the read head 110 within the $i^{th}$ period. The total length of the preceding integer number of periods can be calculated via the period information i, and the intra-period position information is a position in which the read head is currently located in the period, and the two are added to obtain the current position of read head 110 relative to the display device. Without loss of generality, the "positions" here all refer to the position relative to the display device, and since the position of the display device is known to a system, various absolute positions can be obtained according to the coordinate system transformation.

When the read head 110 moves relative to the light and dark fringe, a collected light intensity signal will also move correspondingly, and the central point of the photosensitive element will also proceed from one period to another period. At this moment, the position Xi in a period will change periodically with the replacement of period. When the central point of the photosensitive element in the read head 110 proceeds from a current period to another period, the period number i (i.e. period information) where it is currently located needs to be increased or decreased.

The replacement of period can be judged in numerous ways. In practice, pattern reading and position determining are performed continuously, repeatedly, and circularly, and accordingly, a particular method for judging the increasing and decreasing of i is as follows: the system will compare the position Xi in a period measured via the light and dark period fringes to the Xi measured in the last cycle; when the read head proceeds to a next period, the Xi will jump to zero from the full period length L, and the current period number is increased by 1; and when the read head backs to a previous period, Xi will jump to the full period length L from zero, and the current period number is decreased by 1.

Although the change in the period information can be calculated and updated by means of the above-mentioned period counting method, there must be reference period information so that the current period information can be accurately learnt. Conventionally, a read head of a position encoder may need to be set, i.e. returning back to a particular position which is known, so as to gain the reference position information.

However, in the present invention, instead of pure incremental measurement, the absolute position information can be obtained by the use of the characteristic that the active position encoder can dynamically display patterns without setting the read head 110.

Figure 3:
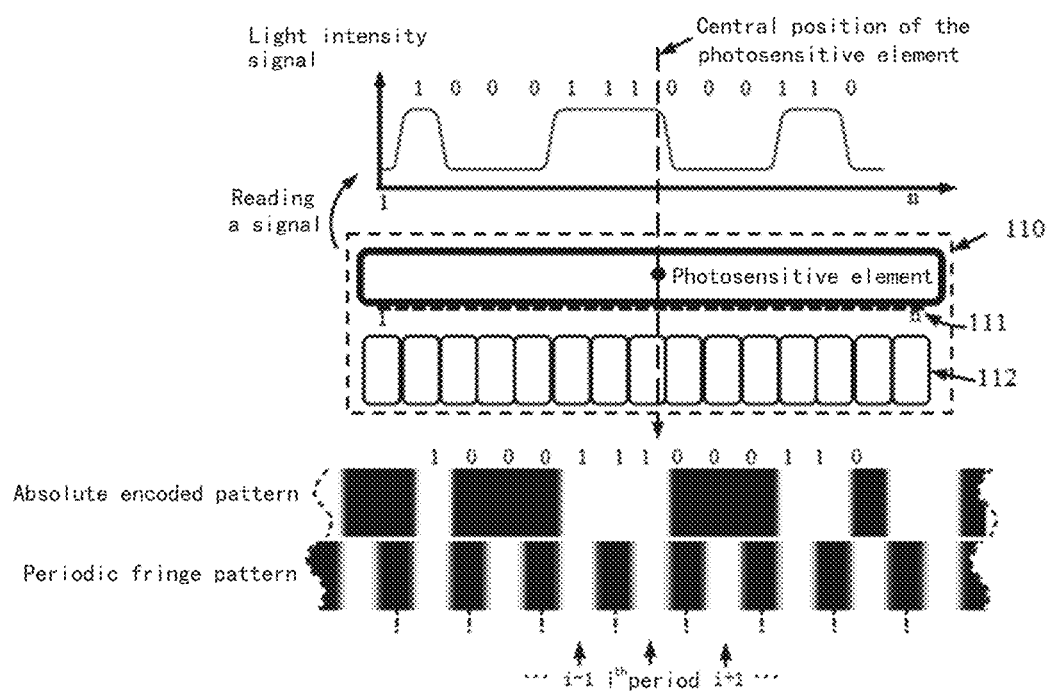
FIG. 3 is a schematic diagram illustrating a read head reading an absolute encoded pattern according to an aspect of the present invention.

FIG. 3 is a schematic diagram illustrating a read head 110 reading an encoded pattern according to an aspect of the present invention. As is well known to a person skilled in the art, the encoded pattern is encoded, so that an absolute position at which the read head 110 is currently located can be determined according to a particular part of the encoded pattern read by the read head 110.

A common pattern encoding method is to adopt a pseudo random sequence, wherein the pseudo random sequence $\{a_n\}$ is a binary sequence with the period of $2^m-1$, and is called an m-order pseudo random sequence for short. The sequence has many properties, one of which is that rankings composed of any adjacent m binary numbers are all different from one another, and this provides a theoretical basis for the sequence to serve as an absolute position encoding method. In an experimental screen, if an 8-order primitive polynomial is used to generate an 8-order pseudo random sequence, the length of the sequence is $2^8-1=255$. Every eight adjacent binary numbers form an index code, wherein binary 1 represents white, and binary zero represents black. As such, 255 black and white fringe encoding is displayed on the screen to mark 255 absolute positions.

An n-order pseudo random sequence can be generated by an n-order primitive polynomial, for example, the polynomial of an 8-order pseudo random sequence is:

$$f(x) = 1 + x^6 + x^8 \quad (2)$$

the pseudo random sequence satisfies a recurrence relation as follows:

$$a_{i+8} = a_{i+1} + a_{i+6}, (i=0,1, \ldots 248) \quad (3)$$

wherein the operation is a binary addition operation. An initial value is set to 10100011, and then an 8-order sequence is generated as 110001011101001010011000111111011...

FIG. 3 shows a part of the encoded pattern, and also shows a periodic fringe pattern. There is a corresponding relationship between the encoded pattern and the periodic fringe patterns, and this corresponding relationship can be stored in the active position encoder. Due to the corresponding relationship of the two, the particular part of the encoded pattern read by the read head 110 uniquely corresponds to a particular period of the periodic fringe pattern, so that a period number of the period where the read head is located can be judged.

In the figure, in order to clearly show the corresponding relationship between the encoded pattern and the periodic fringe pattern, the patterns of the two are shown at the same time. In practice, the display device can also directly switch the periodic fringe pattern to the encoded pattern. The read head 110 reads a signal of the encoded pattern and transforms the signal into a binary code, a period number i that the read head 110 is currently located is recognized via the binary code, and after the completion of the recognition, the encoded pattern is switched to the periodic fringe pattern for the calculation of the position Xi in a period, and then the current position of the read head is calculated by means of formula 1. With this advantage, a machine can instantly read the current position when being restarted without needing to be set, for example, returning back to a coordinate origin for clearing.

Figure 4:
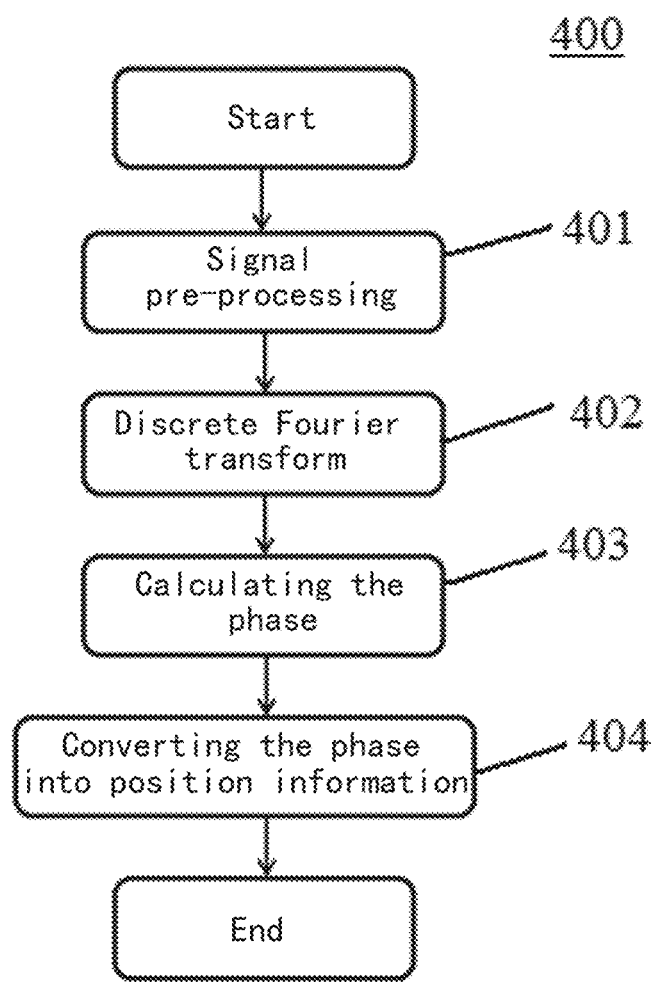
FIG. 4 is a flowchart illustrating a signal processing method for determining intra-period position information about a read head according to an aspect of the present invention.

The algorithm for determining intra-period position information about a read head is illustrated in conjunction with FIGS. 2 and 4 below. FIG. 4 is a flowchart illustrating a signal processing method for determining intra-period position information about a read head.

The position information about the head read 110 is derived by processing the image signal read by the head read 110, and its high revolution depends on the degree of the fineness of fringes on a screen and the number of pixel points of a camera itself. Obviously, using a screen as a grating cannot refine the size of the fringes to that of a traditional grating. To this end, accurate position information is obtained by performing signal processing on the image signal in the present invention.

The core of the signal processing is to use frequency domain transformation such as discrete Fourier transform (DFT) to calculate the phase of a fundamental frequency of the image signal so as to determine an absolute position of the read head in one period through the phase. As shown in FIG. 2, a signal collected here is a one-dimensional array $X_n$, which has N sampling points in an x direction (i.e. the direction of lightness and darkness change) in total. With regard to a linear array photosensitive element, $X_n$ embodies a light intensity signal obtained by each photosensitive pixel point; and with regard to an area array photosensitive element, $X_n$ is a one-dimensional array constituted by average values of light intensity signals of photosensitive pixel points in the x direction in a photosensitive area, which has N dimensions in total.

As shown in FIG. 4, the signal processing algorithm 400 comprises the following steps:

step 401: executing signal pre-processing on an image signal, and in order to reduce errors of DFT, selecting an appropriate window function and correcting the phase, wherein as a particular example, the first method uses a Hanning window function, and the second method uses a standard window function, and what is finally calculated by the two methods is the phase at an intermediate point of a signal, i.e. the phase of the position of a central point of the photosensitive element;

step 402: executing discrete Fourier transform on the pre-processed image signal;

step 403: calculating the phase;

and step 404: calculating intra-period position information according to the phase.

In the first example, the signal processing method of the Harming window function is used:

a. signal pre-processing: the collected light intensity signal is $X_n$, and the pre-processed signal $S_n$ can be expressed as:

$$S_n = X_n h_n, n=0,1,2,\ldots,N-1 \quad (4)$$

where N is the total number of points, and $h_n$ is the Harming window function which is in the form of:

$$h_n = 0.5 - 0.5 \cos\left(\frac{2\pi n}{N-1}\right), \quad (5)$$

$$n = 0, 1, 2, \ldots, N-1.$$

b. discrete Fourier transform: the frequency spectrum of $S_n$ is calculated:

$$F(m) = \sum_{n=0}^{N-1} S_n e^{-\frac{i2\pi mn}{N}}, \quad (6)$$

$$m = 0, 1 \ldots N-1.$$

and a sequence number $k_1$ leading to the maximum value of an absolute value of F is found;

c. calculating the phase: the phase of the fundamental frequency is:

$$\theta_0 = arg[F(k_1)]. \quad (7)$$

where arg[■] is the phase for obtaining [■]; the phase at the intermediate point of the signal is:

$$\theta = \theta_0 + \frac{\pi k_1 (N-1)}{N}. \quad (8)$$

and θ is normalized between zero to 2π;

$$\theta = mod(\theta, 2\pi). \quad (9)$$

and d. converting the phase into the intra-period position information:

$$X_i = \frac{\theta}{2\pi} L. \quad (10)$$

where L is a light and dark period length.

In the second example, the signal processing method of the standard window function is used:

a. signal pre-processing: subsequent processed signals $P_n$ and $Q_n$ can be expressed as:

$$P_n = w_n X_n, n=0,1,\ldots,N-1, \quad (11)$$

$$Q_n = w_{N-n-1} X_n, n=0,1,\ldots,N-1. \quad (12)$$

where $w_n$ is the standard window function which has the form of:

$$w_n = 1 + \sum_{j=1}^{3} d_j \cos\left(\frac{2\pi n j}{N}\right), \quad (13)$$

where $d_1 = -1.43596$, $d_2 = 0.497536$, and $d_3 = -0.061576$;

b. discrete Fourier transform: the frequency spectrums of $P_n$ and $Q_n$ are respectively calculated:

$$E_1(m) = \sum_{n=0}^{N-1} P_n e^{-\frac{i2\pi mn}{N}}, \quad (14)$$

$$m = 0, 1 \ldots, N-1.$$

-continued $$E_2(m) = \sum_{n=0}^{N-1} Q_n e^{-\frac{i2\pi mn}{N}}, \quad (15)$$

$$m = 0, 1, \ldots, N-1.$$

and a sequence number $k_2$ leading to the maximum value of an absolute value of $E_1$ is found;

c. calculating the phase: the phase at the intermediate point of the signal is:

$$\theta = \arg[E_1(k_2) + E_2(k_2)] + \frac{\pi k_2(N-1)}{N}. \quad (16)$$

and $\theta$ is normalized between zero to $2\pi$;

$$\theta = mod(\theta, 2\pi). \quad (17)$$

and d. converting the phase into single-period position information:

$$X_i = \frac{\theta}{2\pi} L. \quad (18)$$

so far, the specific position of the read head 110 can be obtained by calculating the intra-period position information and adding period information about a period in which the read head 110 is located.

The measurement of single-dimensional position information by the read head 110 is shown above, for example, the measurement of the position information about a periodic fringe pattern in the direction of fringe change. In order to obtain the intra-period position information, it can be seen from the above-mentioned signal analysis algorithm that a section of image in the direction of fringe change needs to be obtained so as to obtain a signal with changing lightness and darkness (light intensity) so as to calculate the phase.

Figure 5:
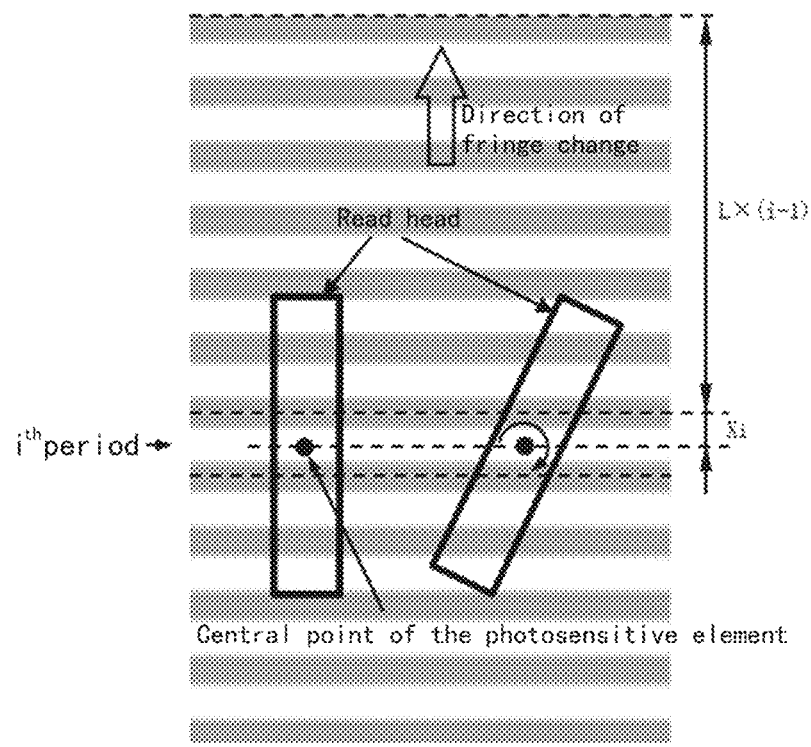
FIG. 5 is a schematic diagram illustrating a case of different orientations of an imaging area of a read head relative to fringes according to an aspect of the present invention.

FIG. 5 is a schematic diagram illustrating a case of different orientations of an imaging area of a read head relative to a fringe. Ideally, for the one-dimensional position information about the read head in the direction of measuring fringe change, the imaging area (in particular, in a length direction thereof) of the read head should keep consistent with the direction of fringe change, as is shown by the read head on the left, for example. However, in practice, the read head is likely to perform multi-dimensional motion in a plane with a motion system, for example, the multi-dimensional motion can comprise a linear motion and a rotary motion. At this moment, the imaging area of the read head is likely to be at a certain angle with the direction of fringe change, as is shown by the read head at the right side in the figure. At this moment, the amount of information reflecting the fringe change in the image signal read by the read head becomes less, such that the measurement precision becomes poor. In an extreme situation, when a length direction of the imaging area of the read head is perpendicular to the direction of fringe change, the collected image signal does not contain the information reflecting the lightness and darkness change of fringes, such that the phase calculation cannot be performed.

In practice, when the angle between the imaging area of the read head and the direction of fringe change exceeds 45 degrees, the measurement performance is significantly deteriorated, and therefore the traditional position encoder cannot measure a plane position of a motion object rotating with a large angle.

However, according to the active position encoder of the present invention, since a display device can dynamically display a pattern, when an included angle between an imaging area of a first read head and the direction (for example, a first direction) of fringe change of a first periodic pattern read by the first read head exceeds 45 degrees, the display device can change the direction of fringe change of the first periodic pattern from a first direction to a second direction perpendicular to the first direction for example; and at this moment, the first read head can be used for reading position information in the second direction. A second read head, originally used for measuring the position information in the second direction, of the active position encoder originally reads a second periodic pattern with fringes changing light and darkness in the second direction. At this moment, an included angle between an imaging area of the second read head and the second direction also necessarily exceeds 45 degrees, and therefore the direction of fringe change of the second periodic pattern is also correspondingly switched from the second direction to the first direction; and at this moment, the second read head can be alternatively used for determining the position information in the first direction, and thereby being able to ensure that plane position information about a motion system is measured accurately.

Figure 6:
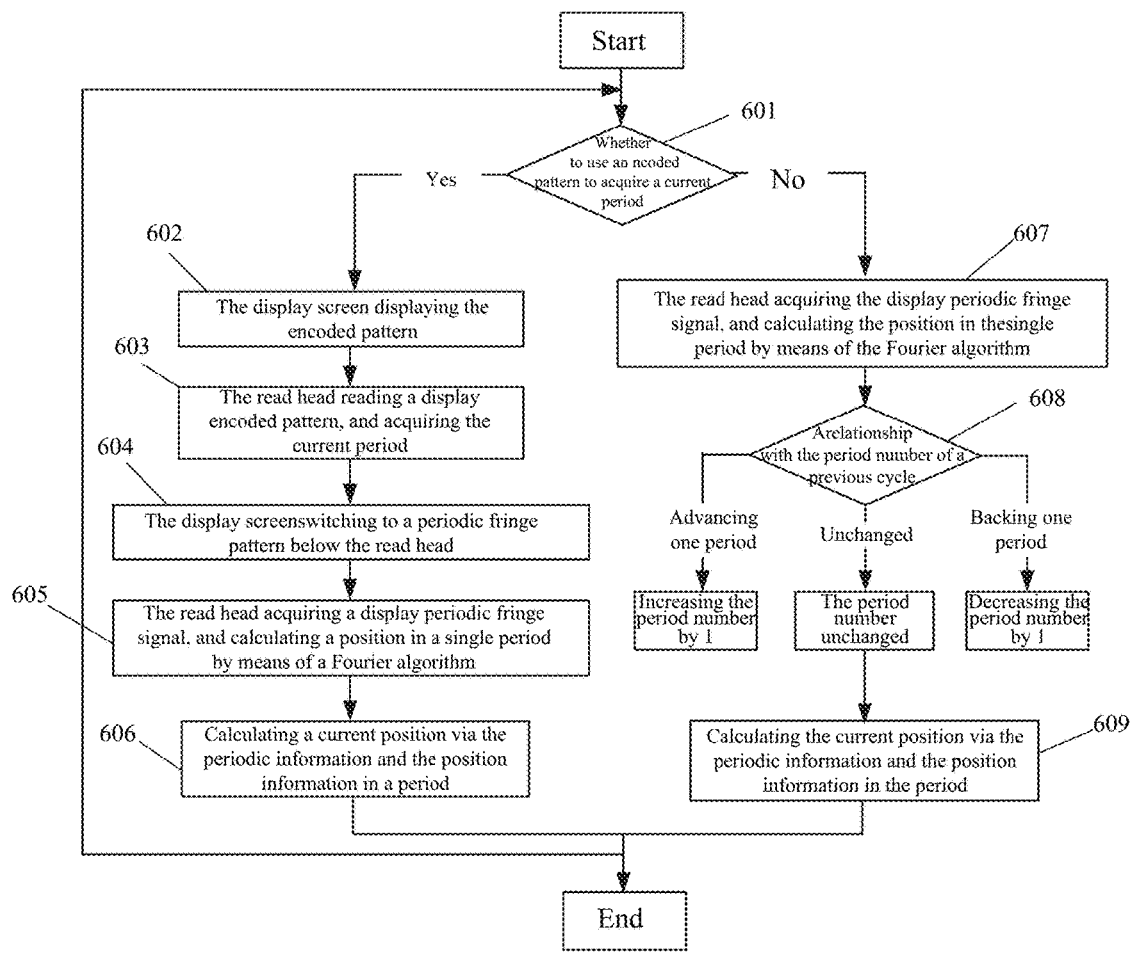
FIG. 6 is a flowchart illustrating a method for determining single-dimensional position information by a read head according to an aspect of the present invention.

FIG. 6 is a flowchart illustrating a method 600 for determining single-dimensional position information by a read head according to an aspect of the present invention. As shown in FIG. 6, the method 600 may comprise the following steps:

step 601: judging whether to use an encoded pattern for acquiring a current period, and if so, the process entering step 602, otherwise the process entering step 607;

step 602: a display device displaying the encoded pattern;

step 603: the read head reading the displayed encoded pattern, and acquiring the current period;

step 604: the display device switching a pattern below the read head to a periodic fringe pattern;

step 605: the read head acquiring a displayed periodic fringe signal, and calculating intra-period position information by means of a Fourier algorithm;

step 606: calculating a current position of the read head via the period information and the intra-period position information;

step 607: the read head acquiring the displayed periodic fringe signal, and calculating the intra-period position information by means of the Fourier algorithm;

step 608: judging the relationship between a period number of a period that the read head is currently located and a period number of a previous cycle, and obtaining an updated period number, i.e. period information, by adding one to, unchanging or subtracting one from the period number according to the relationship;

and step 609: calculating a current position of the read head via the period information and the intra-period position information;

entering the next cycle, or bringing to an end.

In the method, a system cycle will recognize whether to acquire the period number via the encoded pattern when starting, and if so, the system will switch to the encoded pattern to recognize a current period number i; next, the system will switch to light and dark periodic fringes to calculate the position Xi in a single period; and finally, a current one-dimensional position of the read head is calculated through formula 1.

If the encoded pattern is not used to recognize the period number, the period number of the previous cycle will be used; however, the period number of the previous cycle is not necessarily equal to a period number of the current cycle because the read head may have advanced a section of distance and enters the range of another period. Hence, the current period number i is derived by judging the period number increase and decrease based on the previous period number. After the current period number is determined, the position Xi in a single period is the added such that the current one-dimensional position of the read head can be calculated.

Although the above-mentioned methods are illustrated and described as a series of actions for simplifying explanation, it should be understood and appreciated that the methods are not limited to the order of the actions, because according to one or more embodiments, some actions can occur in a different order and/or occur concurrently with other actions illustrated and described herein, or not illustrated and described herein but can be understood by a person skilled in the art.

The above-mentioned contents illustrate that a single read head measures one-dimensional position information, and in the situation that the active position encoder is equipped with a plurality of read heads so as to obtain the one-dimensional position information in different dimensions (for example, two orthogonal dimensions), position information about a planar motion of multi-degrees of freedom of a motion system can be determined. For example, a self-spinning angle of the motion system can be calculated via one-dimensional position information about one or two read heads.

Figure 7A:
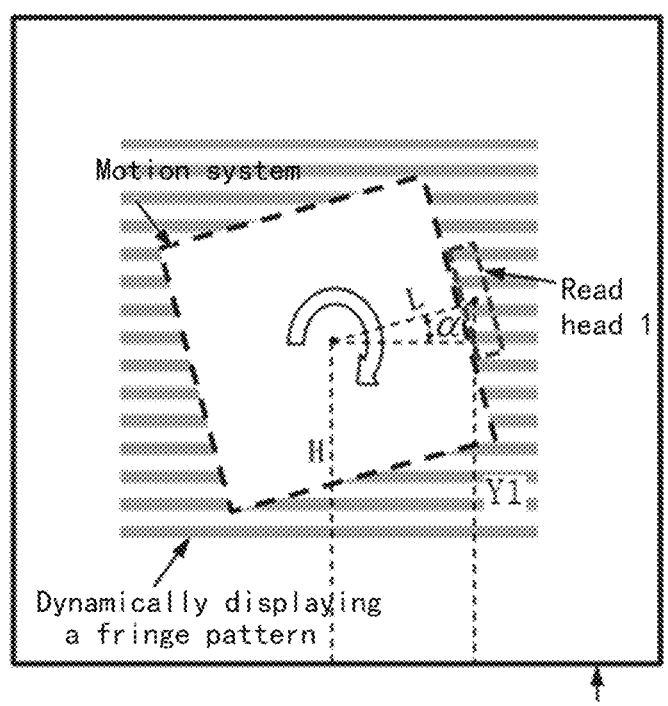
FIGS. 7a and 7b illustrate geometric schematic diagrams of using the single-dimensional position information about a read head to calculate a self-spinning angle according to an aspect of the present invention.
Figure 7B:
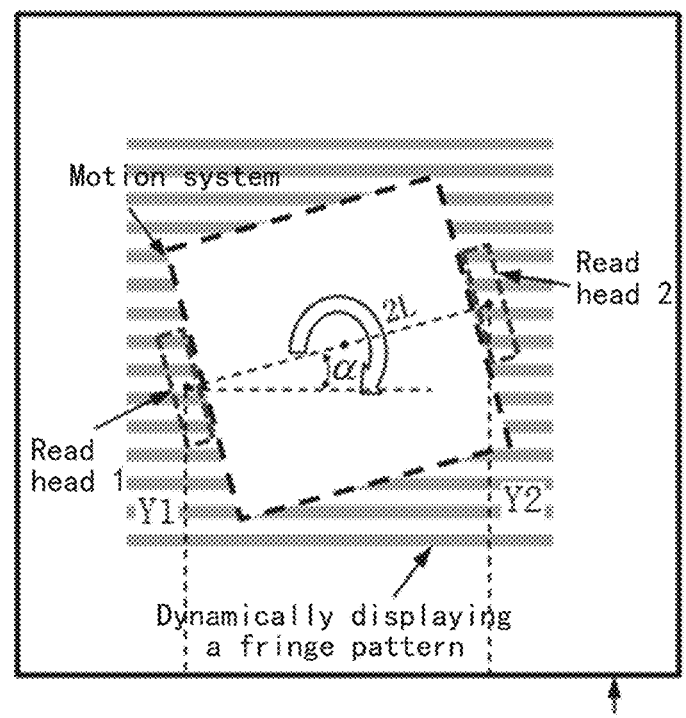

FIGS. 7a and 7b illustrate geometric schematic diagrams of using single-dimensional position information about a read head to calculate a self-spinning angle according to an aspect of the present invention. FIG. 7a illustrates using one read head to determine a self-spinning angle of a motion system, and FIG. 7b illustrates using two read heads to determine a self-spinning angle of a motion system.

Since the read head can only measure a one-dimensional linear distance, the angle needs to be calculated via trigonometric inverse functions. In the figure, L is the distance from a spinning center to a central point of a photosensitive element of a read head, and is a system parameter determined to be known. H is the distance from the spinning center to a starting edge of the display device, and can also be determined to be known in the situation of only performing a rotary motion in the motion system without a linear motion component.

In FIG. 7a, the angle calculation formula is:

$$\alpha = \arcsin\left(\frac{Y_1 - H}{L}\right) \quad (19)$$

In FIG. 7b, the angle calculation formula is:

$$\alpha = \arcsin\left(\frac{Y_2 - Y_1}{2L}\right) \quad (20)$$

where $Y_2$ and $Y_1$ can be respectively determined via a read head 1 and a read head 2.

According to the knowledge of plane geometry, a multi-dimensional planar motion in a plane can be divided into a plurality of motions independent from one another in a one-dimensional direction. On the contrary, a plurality pieces of one-dimensional linear position information can be obtained via a plurality of read heads so as to determine multi-dimensional position information about the motion system. FIGS. 8a to 8f illustrate a schematic diagram of using a plurality of read heads to measure multiple degrees of freedom according to an aspect of the present invention, wherein six common motion forms and corresponding measurement solutions are provided.

The motion system of FIG. 8a can only realize a one-dimensional linear motion, and is the most common motion system. The system can measure linear position information only needing to use one single-dimensional read head.

The motion system of FIG. 8b can only realize a one-dimensional rotary motion, and is generally a common rotary table in industry, for example. The system can measure information about a rotation angle by using one single-dimensional read head. The system can also adopt the solution of two single-dimensional read heads to measure an angle, and as shown in FIG. 7b, the solution has higher measurement precision.

The motion system of FIG. 8c can realize translational movement in two directions of X and Y axes, and is a common industrial motion platform. The system uses two read heads orthogonal with each other in an imaging area to respectively measure position information in X and Y directions.

The motion system of FIG. 8d can realize a one-dimensional (Y axis direction) linear motion and a rotary motion system. The system can use two read heads to measure information about Y and α.

The motion system of FIG. 8e can realize a two-dimensional planar motion similar to the motion of a planar motor, and comprises the translation in X and Y axes and the rotation around itself. The system can use three read heads to measure information about three positions Y, Y and θ. In these three read heads, the orientation of an imaging area of a read head 1 is consistent with that of an imaging area of a read head 3, so as to measure one-dimensional position information in the Y direction; a read head 2 is perpendicular to the two so as to measure one-dimensional position information in the X direction; and finally, the information about three positions Y, Y and α of the motion system is calculated according to these three.

The motion system of FIG. 8f uses a read head with a degree of freedom far more than that of the system itself to perform measurement. This measurement method is redundant measurement. More position information can be obtained by using more than three read heads so as to enable the finally obtained position information to be more precise.

Figure 9:
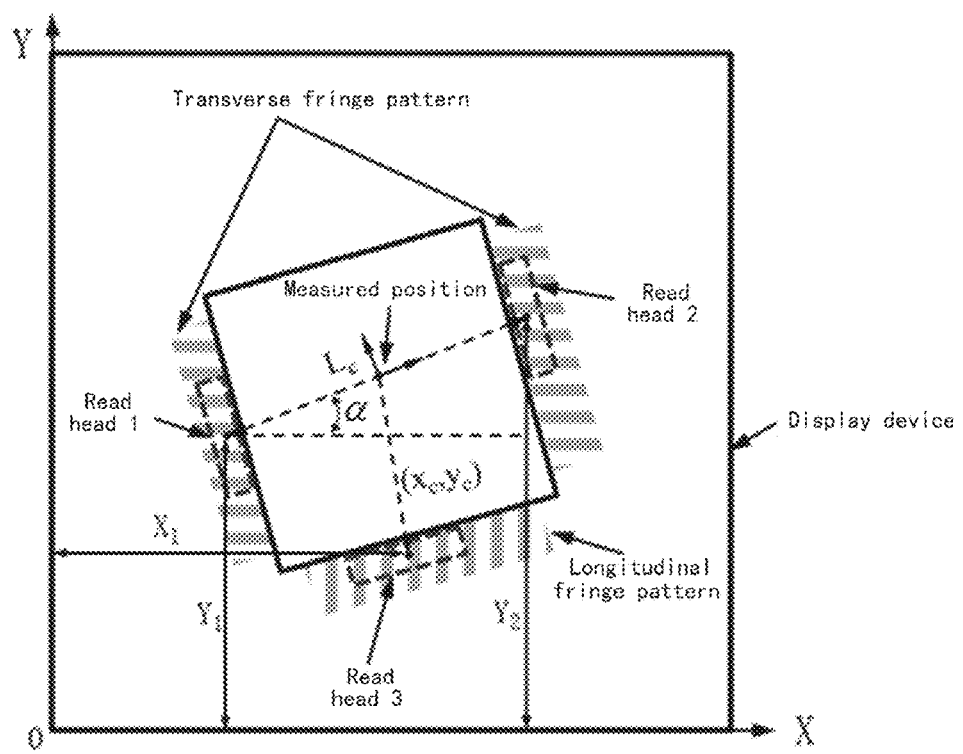
FIG. 9 illustrates a geometric schematic diagram of using single-dimensional position information about a plurality of read heads to calculate multi-degree of freedom position information according to an aspect of the present invention.

According to geometry, a planar position of the motion system can be easily obtained via one-dimensional position information in different dimensions. FIG. 9 illustrates an exemplary calculation solution. In this solution, three read heads are mounted on a measured object (i.e. a motion system), and a display device serves as a position reference. The orientation of a read head 1 is consistent with that of a read head 2 so as to measure the distance of two Y directions, and the orientation of a read head 3 is perpendicular to that of the former two so as to measure the distance of one X direction. x and y coordinates of a certain measuring point (for example, the center of gravity) of a motion system are used as x and y coordinates of the motion system. Assuming that the measuring point is at the center of a connecting line of central points of photosensitive elements of the read head 1 and the read head 2, Lc is the distance between the central points of two photosensitive elements of the read head 1 and the read head 2, and ($x_c$, $y_c$) are position parameters of a coordinate of a central point of a photosensitive element of the read head 3 relative to the measuring point, these three parameters can be obtained by means of system marking. Finally, three degrees of freedom of the measured position can be obtained by using the following formulas:

$$X = X_1 + y_c \sin\theta - x_c \cos\theta \tag{21}$$

$$Y = \frac{Y_1 + Y_2}{2} \tag{22}$$

$$\alpha = \arcsin\left(\frac{Y_2 - Y_1}{2L}\right) \tag{23}$$

In order to measure the one-dimensional position information in different dimensions above, it is necessary to display periodic patterns in different directions in the display device, for example, a first periodic pattern and a second periodic pattern that change light and dark periodically in a first direction (such as an x axis direction) and a second direction (such as a y axis direction), as shown in FIGS. 8c, 8e and 8f. Different read heads need to read corresponding periodic patterns.

The active position encoder according to the present invention makes full use of the characteristic that a display device can dynamically display a pattern, such that various read heads can read periodic patterns of required directions by multiple methods.

Method 1: Following Method

The display device will dynamically display a required fringe pattern in an area below each read head, so that various single-dimensional read heads can simultaneously acquire the patterns in the required directions.

Method 2: Switching Method

The display device rapidly switches periodic fringe patterns in two directions, so that various read heads read information when their respective target fringe patterns appear.

Method 3: Filtering Method

Fringe patterns of the display device in two vertical directions are displayed by using two different colours, each read head is mounted with a filter of a required colour or uses a colour photosensitive element, so that the required fringe patterns can transparently transmit into a required photosensitive system, while undesired fringe information will be removed and filtered by a filter disc.

Method 4: Polarizing Method

Fringe patterns in two different directions displayed by the display device have a vertical light polarization direction. Each read head is mounted with a required polaroid. The polarization direction of the required fringe pattern is the same as the direction of the polaroid of the read head so that the read head is entered, while undesired fringe patterns will be removed by filtering since the polarization direction and the polarization direction of the read head are perpendicular to each other.

Figure 10:
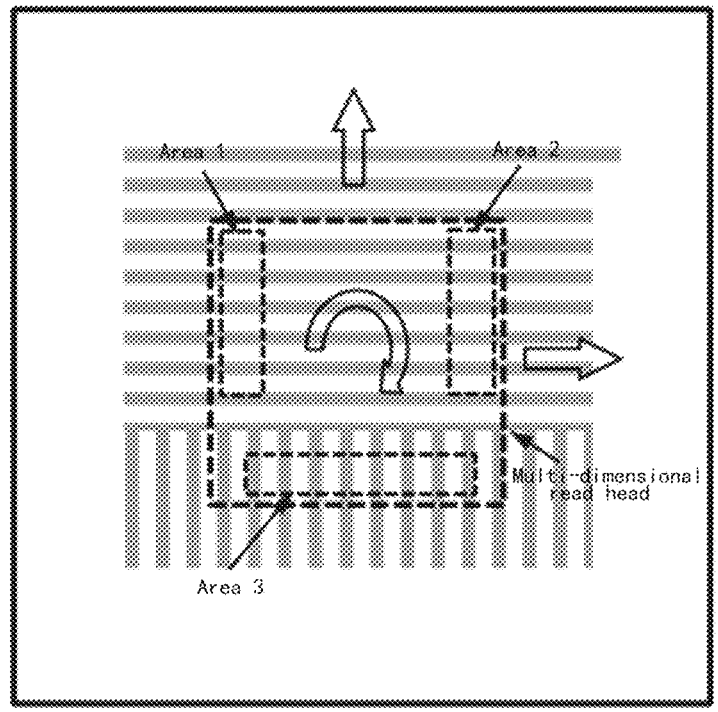
FIG. 10 is a schematic diagram illustrating a multi-dimensional read head according to an aspect of the present invention.

Each read head above only measures one-dimensional position information in one dimension, for example, this kind of read head can adopt a linear array photosensitive element or an elongated area photosensitive element. However, the read head can further use an area array photosensitive element such that a single read head can measure a multi-dimensional read head of multiple degrees of freedom. The multi-dimensional read head separates a photosensitive area of the area array photosensitive element into a plurality of small areas, and each independent small area is responsible for measuring information about one degree of freedom. The method for measuring the position of each small area is consistent with the method for measuring a single-dimensional read head. In other words, each read head above for measuring the one-dimensional position information can be a part of the multi-dimensional read head. FIG. 10 is a schematic diagram illustrating a multi-dimensional read head according to an aspect of the present invention.

Figure 11:
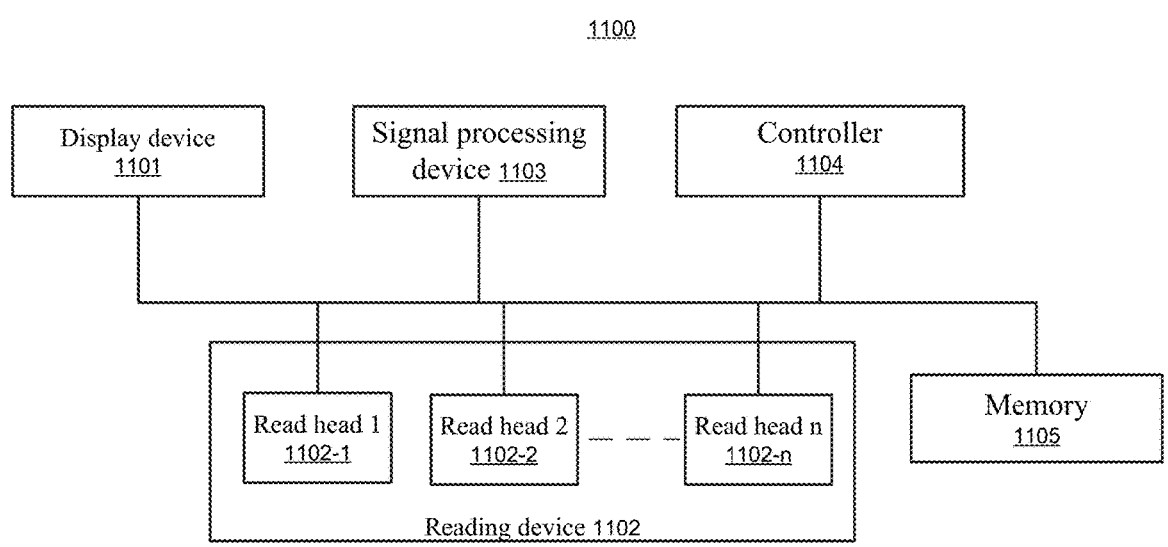
FIG. 11 is a block diagram illustrating an active position encoder according to an aspect of the present invention.

FIG. 11 is a block diagram illustrating an active position encoder 1100 according to an aspect of the present invention.

As shown in FIG. 11, the active position encoder 1100 can comprise a display device 1101 and a reading device 1102. The display device 1101 can dynamically display at least a first pattern, for example a first periodic pattern, and the first periodic pattern changes periodically in a first direction. The display device 1101 can be a display screen, a projector, a light-emitting diode array, etc.

The reading device 1102 can be attached to a motion system (not shown), and the motion system can move in a plane relative to the display device 1101. The reading device 1102 can comprise at least one read head, for example, 1102-n. This read head (for example, a first read head 1102-1) reads the first pattern, for example the first periodic pattern, so as to obtain an image signal of a part of the periodic pattern in the first direction.

The active position encoder 1100 can further comprise a signal processing device 1103, and the latter can execute signal processing on the obtained image signal of the first read head 1101-1 so as to determine a single-dimensional position, for example a single-dimensional position in the first direction, of the first read head 1103 relative to the display device.

The signal processing device 1103 can determine period information about a period in which the first read head 1103 is located and intra-period position information in the period in which the first read head is located, and determine the single-dimensional position based on the two.

In order to determine the period information, the display device 1101 displays an encoded pattern extending in the first direction, and the first read head 1102-1 can read the encoded pattern so as to obtain the period information. For example, the encoded pattern has a corresponding relationship with the periodic pattern of the first periodic pattern. The first read head 1102-1 can read the encoded pattern so as to obtain a particular part of encoded pattern. Accordingly, the signal processing device 1103 can determine the period information about a period in which the first read head 1102-1 is located based on the corresponding relationship between the particular part of encoded pattern and the encoded pattern, and the first periodic pattern.

Alternatively, the period information can also be calculated by means of period calculation. For example, the active position encoder 1100 can further comprise a memory 1105, wherein the memory 1105 can store the above-mentioned period information about the first read head 1101-1. With the movement of a motion system, when the first read head moves from one period of the first periodic pattern to a next period or a previous period in said first direction, the signal processing device 1103 correspondingly add one to or subtract one from the period information so as to update the period information about the first read head stored in the memory 1105.

In order to determine the above-mentioned intra-period position information, the signal processing device 1103 can execute frequency domain transformation, for example discrete Fourier transform, on the image signal of the first read head, extract phase information about a fundamental frequency component of the image signal, and determine the intra-period position information about the first read head 1102-1 based on the phase information. Preferably, the signal processing device 1103 can first pre-process the image signal of the firstly read head 1102-1, and then executes the above-mentioned frequency domain transformation on the pre-processed image signal.

The active position encoder 1100 can further comprise a controller 1104, and the latter can control the operation of the active position encoder 1100, for example being able to control the display device 1101 to dynamically display a pattern.

The display device 1101 can change the direction of periodic change of the first periodic pattern from a first direction to a second direction. Thereby, the first read head 1102-1 can read the first periodic pattern so as to obtain an image signal of a part of the periodic pattern in the second direction, and the signal processing device 1103 can execute signal processing on the image signal of the first read head so as to determine a single-dimensional position of the first read head 1102-1 in the second direction relative to the display device 1101. Doing this is meaningful, for example, with the movement of the motion system, when an included angle between a length direction of an imaging area of the first read head 1102-1 and the first direction exceeds 45 degrees, the display device 1101 changes the direction of periodic change of the first periodic pattern from the first direction to the second direction perpendicular to the first direction. At this moment, accordingly, the first read head 1102-1 reads the first periodic pattern so as to obtain an image signal of a part of the periodic pattern in the second direction, and the signal processing device 1103 executes signal processing on the image signal of the first read head 1102-1 so as to determine a single-dimensional position of the first read head 1102-1 in the second direction.

In an example, the display device 1101 can further dynamically display a second periodic pattern, and the second periodic pattern changes periodically in the second direction. For example, the first direction is perpendicular to the second direction. Correspondingly, the reading device 1102 can comprise a second read head, such as a read head 1102-2, which can read the second periodic pattern so as to obtain the image signal of a part of the periodic pattern in the second direction. The signal processing device 1103 can execute signal processing on the image signal of the second read head so as to determine a single-dimensional position of the second read head 1102-2 in the second direction relative to the display device 1101. Further, the signal processing device 1103 can determine plane position information about the motion system based on the single-dimensional positions of the first and second read heads.

In an example, the reading device 1102 can further comprise a third read head, wherein the third read head can read the above-mentioned first periodic pattern so as to obtain an image signal of a part of the periodic pattern in the first direction. The signal processing device 1103 can execute signal processing on the image signal of the third read head so as to determine a single-dimensional position of the third read head in the first direction relative to the display device 1101. Further, the signal processing device 1103 can determine the plane position information about the motion system based on the single-dimensional positions of the first, second and third read heads. Here, all the motion positions of the motion system in the plane can be calculated based on the position information about three dimensions.

Preferably, the reading device 1102 can further comprise a fourth read head, wherein the fourth read head can read a second periodic pattern so as to obtain an image signal of a part of the periodic pattern in the second direction. The signal processing device 1103 can execute signal processing on the image signal of the fourth read head so as to determine a single-dimensional position of the fourth read head in the second direction relative to the display device 1101. The signal processing device 1103 can determine the plane position information about the motion system based on the single-dimensional positions of the first, second, third and fourth read heads. The single-dimensional position of the fourth read head here is redundant for determining the plane position information about the motion system, so as to be used for improving the position measurement precision of the motion system.

Here, the movement of the motion system relative to the display device 1101 comprises a linear motion and a self-spinning motion in the first direction and the second direction, and correspondingly, the plane position information comprises a coordinate position and a self-spinning angle in the first direction and the second direction.

In order to enable that each read head can read a pattern in a required direction, the display device 1101 can dynamically display the pattern under the control of the controller 1104. In an example, with the movement of each read head, the display device 1101 dynamically displays, in a reading area of each read head, a periodic pattern that the read head should read, so that each read head can acquire a periodic pattern in a required direction. In another example, the display device 1101 can display first and second periodic patterns in a time-sharing manner, and in this situation, each read head is synchronized with the display of the display device 1101 in a time-sharing manner, so as to perform reading when the periodic pattern that the read head should read is displayed. In still another example, the display device 1101 displays the first and second periodic patterns simultaneously with two colours, and in this situation, each read head is mounted with a filter or comprises a colour photosensitive element so as to be able to transparently transmit the periodic pattern that the read head should read while shielding the other periodic pattern. The display device 1103 can display the first and second periodic patterns simultaneously with two polarized light, and in this example, each read head is mounted with a corresponding polaroid so as to be able to transparently transmit the periodic pattern that the read head should read while shielding the other periodic pattern.

Although FIG. 11 shows a plurality of read heads 1101-n, each read head can also be a part of a multi-dimensional read head adopting an area array photosensitive element, as shown in FIG. 10.

It will be appreciated by a person skilled in the art that information and a signal can be represented by using any technology and technique in various different technologies and techniques. For example, data, instructions, commands, information, signals, bits (bit), code elements and code chips that are cited throughout the above-mentioned description can be represented by voltage, current, electromagnetic waves, magnetic fields or magnetic particles, optical fields or optical particles, or any combination of them.

It will be further appreciated by a person skilled in the art that various illustrative logic blocks, modules, circuits, and algorithm steps described in conjunction with the embodiments disclosed herein can be implemented as electronic hardware, computer software, or a combination of both. In order to clearly illustrate the interchangeability between hardware and software, various illustrative components, frames, modules, circuits, and steps are generalizedly described above in the form of its functionalities. Whether such functionalities are implemented as hardware or software is dependent on a specific application and design constrains imposed on the entire system. A person skilled could implement the described functionalities in different manners for each particular application, but this implementation decision should not be construed as resulting in departing from the scope of the present invention. The various illustrative logic blocks, modules, and circuits described in conjunction with the embodiments disclosed herein can be implemented and executed with a general-purpose processor, a digital signal processor (DSP), an application-specific integrated circuit (ASIC), a filed programmable gate array (FPGA) or other programmable logic devices, discrete gates or transistor logics, discrete hardware components, or its any combination designed to execute the functions described herein. The general-purpose processor can be a micro-processor, but in an alternative, the processor can be any conventional processor, controller, micro-controller or state machine. The processor can also be implemented as a combination of computer devices, e.g. a combination of a DSP and a micro-processor, a plurality of micro-processors, one or more micro-processors cooperating with a DSP core, or any other such configurations.

The steps of the method or algorithm described in conjunction with the embodiments disclosed herein can be embodied in hardware, software module executed by the processor, or a combination of both. The software module can reside in an RAM memory, a flash memory, an ROM memory, an EPROM memory, an EEPROM memory, a register, a hard disk, a removable disk, a CD-ROM, or any other type of storage medium known in the art. An exemplary storage medium is coupled to the processor, so that the processor can read and write information from/to the storage medium. In an alternative, the storage medium can be integrated into the processor. The processor and the storage medium can reside in an ASIC. The ASIC can reside in a user terminal. In an alternative, the processor and the storage medium can reside in the user terminal as discrete components.

In one or more exemplary embodiments, the described functions can be implemented in hardware, software, firmware or their any combination. If they are implemented as a computer program product in software, then various functions can be stored in a computer readable medium as one or more instructions or codes or transported via same. The computer readable medium comprises both a computer storage medium and a communication medium, and comprises any medium facilitating a computer program to transfer from one place to another. The storage medium can be any available medium that can be accessed by a computer. As an example but not limitation, such a computer readable medium can comprise RANI, ROM, EEPROM, CD-ROM or other optical disk storages, magnetic disk storages or other magnetic storage device, or any other medium that can be used for carrying or storing appropriate program codes in the form of instructions or data structures and can be accessed by a computer. Any connection is also rightly called a computer readable medium. For example, if the software is transported from a web site, a server, or other remote sources using a coaxial-cable, an optical fibre cable, a twisted pair, a digital subscriber line (DSL), or wireless techniques such as infrared, radio, and microwave or any thing like that, then the coaxial-cable, the optical fibre cable, the twisted pair, the DSL, or the wireless techniques such as infrared, radio, microwave or anything like that are included in the definition of medium. Disks and discs as used herein comprise a compact disc (CD), a laser disc, an optical disc, a digital versatile disc (DVD), a floppy disk and a blue-ray disc, wherein the disks often reproduce data magnetically, and the discs optically reproduce data with laser. Combinations of the forgoing should also be included in the range of the computer readable medium.

The previous description of the present disclosure is provided to enable any one skilled in the art to make or use the present disclosure. Various modifications to the present disclosure would all be obvious to a person skilled in the art, and the general principles defined herein can be applied to other variations without departing from the spirit or scope of the present disclosure. Thereby, the present disclosure is not intended to be limited to the examples and designs described herein, but should be granted with the widest scope consistent with the principle and novelty features disclosed herein.

What is claimed is:

1. An active position encoder, comprising:
    a display device, said display device being used for displaying at least a first pattern;
    a reading device, said reading device comprising at least a first read head, wherein said first read head is used for reading said first pattern so as to obtain an image signal; and
    a signal processing device, said signal processing device executing signal processing on the image signal of said first read head so as to determine a single-dimensional position of said first read head relative to said display device,
    wherein said first pattern is a first periodic pattern which changes periodically in a first direction, said first read head reads said first periodic pattern so as to obtain said image signal of a part of the periodic pattern in the first direction, and said signal processing device executes said signal processing on said image signal of said first read head so as to determine a single-dimensional position of said first read head in said first direction relative to said display device.

2. The active position encoder of claim 1, characterized in that
    said signal processing device determines period information about a period in which said first read head is located and intra-period position information in the period in which said first read head is located; and
    determines said single-dimensional position based on said period information and said intra-period position information.

3. The active position encoder of claim 2, characterized in that said display device displays an encoded pattern extending in said first direction,
    wherein said first read head reads said encoded pattern so as to obtain said period information.

4. The active position encoder of claim 2, characterized in that said signal processing device acquires said period information by means of a period counting method.

5. The active position encoder of claim 2, characterized in that said signal processing device:
    executes frequency domain transformation on the image signal of said first read head;

extracts phase information about a fundamental frequency component of said image signal; and determines said intra-period position information about said first read head based on said phase information.

6. The active position encoder of claim 1, characterized in that said display device changes the direction of periodic change of said first periodic pattern from said first direction to a second direction, wherein said first read head reads said first periodic pattern so as to obtain an image signal of a part of the periodic pattern in said second direction, and said signal processing device executes signal processing on the image signal of said first read head so as to determine a single-dimensional position of said first read head in said second direction relative to said display device.

7. The active position encoder of claim 1, characterized in that said display device is further used for displaying additional periodic patterns; and said reading device further comprises additional read heads, wherein each read head reads a corresponding periodic pattern so as to obtain a corresponding image signal, and said signal processing device analyses and processes the image signal of each read head so as to determine a single-dimensional position of each read head relative to said display device, and determines plane position information about a motion system based on the single-dimensional position of each read head relative to said display device.

8. The active position encoder of claim 7, characterized in that said display device is further used for displaying a second periodic pattern, said second periodic pattern changing periodically in the second direction;

said reading device further comprises a second read head, said second read head being used for reading said second periodic pattern so as to obtain an image signal of the part of the periodic pattern in the second direction; and said signal processing device executes signal processing on the image signal of said second read head so as to determine a single-dimensional position of said second read head in said second direction relative to said display device, wherein said signal processing device determines the plane position information about the motion system based on the single-dimensional positions of said first and second read heads.

9. The active position encoder of claim 8, characterized in that said reading device further comprises a third read head, wherein said third read head is used for reading said first periodic pattern so as to obtain an image signal of the part of the periodic pattern in the first direction; and said signal processing device executes signal processing on the image signal of said third read head so as to determine a single-dimensional position of said third read head in said first direction relative to said display device, wherein said signal processing device determines the plane position information about said motion system based on the single-dimensional positions of said first, second and third read heads.

10. The active position encoder of claim 9, characterized in that said reading device further at least comprises a fourth read head, wherein said fourth read head is used for reading said second periodic pattern so as to obtain an image signal of the part of the periodic pattern in the second direction; and said signal processing device executes signal processing on the image signal of said fourth read head so as to determine a single-dimensional position of said fourth read head in said second direction relative to said display device, wherein said signal processing device determines the plane position information about said motion system based on the single-dimensional positions of said first, second, third and fourth read heads.

11. The active position encoder of claim 9, characterized in that relative movement of said motion system and said display device comprises a linear motion and a self-spinning motion in said first direction and said second direction, and said plane position information comprises a coordinate position and a self-spinning angle in said first direction and said second direction.

12. The active position encoder of claim 1, characterized in that said display device displays, in a reading area of each read head, a periodic pattern that the read head should read, so that each read head can acquire a periodic pattern in a required direction; or said display device displays the periodic patterns in a time-sharing manner, wherein each read head reads the periodic pattern that the read head should read when the periodic pattern is displayed; or said display device displays the periodic patterns simultaneously with different colours, wherein each read head is mounted with a filter or uses a colour photosensitive element, so that each read head can read the periodic pattern that the read head should read; or said display device displays the periodic patterns simultaneously with different polarized light, wherein each read head is mounted with a corresponding polaroid, so that each read head can read the periodic pattern that the read head should read.

13. The active position encoder of claim 1, characterized in that each read head is a part of a multi-dimensional read head adopting an area array photosensitive element, and the single-dimensional position of each part of said multi-dimensional read head relative to said display device is used for acquiring multi-dimensional plane position information about a motion system.

14. The active position encoder of claim 1, characterized in that said first periodic pattern is a periodic fringe pattern comprising a series of fringes that change light and dark periodically in a first direction.

15. A method for operating an active position encoder, the method comprising:

displaying at least a first pattern on a display device;

using a first read head of a reading device to read said first pattern so as to obtain an image signal; and executing signal processing on the image signal of said first read head so as to determine a single-dimensional position of said first read head relative to said display device, wherein said first pattern is a first periodic pattern which changes periodically in a first direction, said method further comprising:

using said first read head to read said first periodic pattern so as to obtain said image signal of a part of the periodic pattern in the first direction; and executing said signal processing on said image signal of said first read head so as to determine a single-dimensional position of said first read head in said first direction relative to said display device.

16. The method of claim 15, characterized in that executing the signal processing on the image signal of said first read head so as to determine a single-dimensional position of said first read head in said first direction relative to said display device specifically comprises:
  determining period information about a period in which said first read head is located and intra-period position information in the period in which said first read head is located; and
  determining said single-dimensional position based on said period information and said intra-period position information.

17. The method of claim 16, characterized in that the method further comprises:
  displaying an encoded pattern extending in said first direction; and
  using said first read head to read said encoded pattern so as to obtain said period information.

18. The method of claim 16, characterized in that the method further comprises:
  acquiring said period information by means of a period counting method.

19. The method of claim 16, characterized in that determining the intra-period position information about said first read head specifically comprises:
  executing frequency domain transformation on the image signal of said first read head;
  extracting phase information about a fundamental frequency component of said image signal; and
  determining said intra-period position information about said first read head based on said phase information.

20. The method of claim 15, characterized in that the method further comprises:
  changing the direction of periodic change of said first periodic pattern from said first direction to a second direction on said display device;
  using said first read head to read said first periodic pattern so as to obtain an image signal of a part of the periodic pattern in said second direction; and
  executing signal processing on the image signal of said first read head so as to determine a single-dimensional position of said first read head in said second direction relative to said display device.

21. The method of claim 15, characterized in that said reading device further comprises additional read heads, said method further comprising:
  further displaying additional periodic patterns on said display device;
  using each read head to read a corresponding periodic pattern so as to obtain a corresponding image signal;
  analysing and processing the image signal of each read head so as to determine a single-dimensional position of each read head relative to said display device; and
  determining plane position information about a motion system based on the single-dimensional position of each read head relative to said display device.

22. The method of claim 21, characterized in that the method further comprises:
  further displaying a second periodic pattern on said display device, wherein said second periodic pattern changes periodically in the second direction;
  using a second read head of said reading device to read said second periodic pattern so as to obtain an image signal of a part of the periodic pattern in the second direction;
  executing signal processing on the image signal of said second read head so as to determine a single-dimensional position of said second read head in said second direction relative to said display device; and
  determining the plane position information about said motion system based on the single-dimensional positions of said first and second read heads.

23. The method of claim 22, characterized in that the method further comprises:
  using a third read head of said reading device to read said first periodic pattern so as to obtain an image signal of a part of the periodic pattern in the first direction;
  executing signal processing on the image signal of said third read head so as to determine a single-dimensional position of said third read head in said first direction relative to said display device; and
  determining the plane position information about said motion system based on the single-dimensional positions of said first, second and third read heads.

24. The method of claim 23, characterized in that the method further comprises:
  at least using a fourth read head of said reading device to read said second periodic pattern so as to obtain an image signal of a part of the periodic pattern in the second direction;
  executing signal processing on the image signal of said fourth read head so as to determine a single-dimensional position of said fourth read head in said second direction relative to said display device; and
  determining the plane position information about said motion system based on the single-dimensional positions of said first, second, third and fourth read heads.

25. The method of claim 23, characterized in that displaying the periodic patterns on said display device specifically comprises:
  with the movement of each read head, displaying, in a reading area of said display device corresponding to each read head, a periodic pattern that the read head should read; or
  displaying the periodic patterns in a time-sharing manner on said display device; or displaying the periodic patterns simultaneously with different colours or different polarized light on said display device.

26. The method of claim 21, characterized in that the movement of said motion system relative to said display device comprises a linear motion and a self-spinning motion in said first direction and said second direction, and said plane position information comprises a coordinate position and a self-spinning angle in said first direction and said second direction.

* * * * *